Nov. 7, 1939.                C. O. CRESSY                2,178,563
                      REMOTE INDICATING SYSTEM
                        Filed Jan. 22, 1938
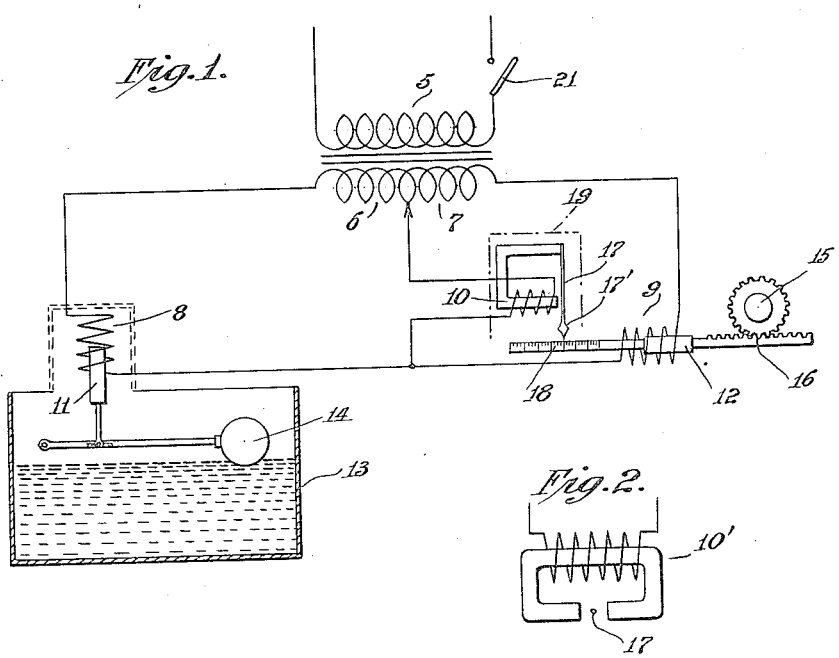
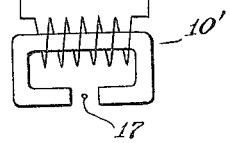
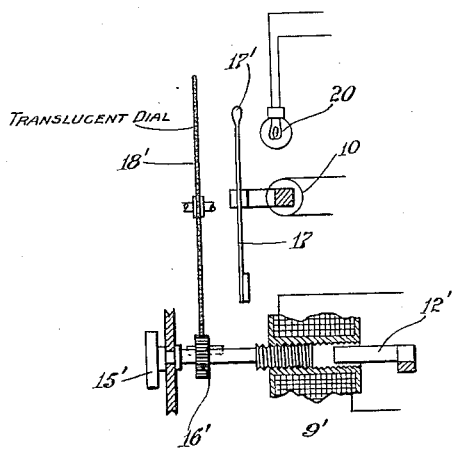
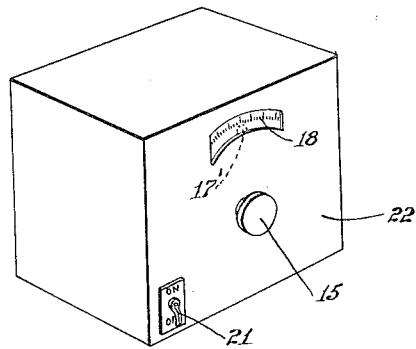
INVENTOR
Charles O. Cressy
BY
ATTORNEY Patented Nov. 7, 1939

2,178,563

UNITED STATES PATENT OFFICE 2,178,563

REMOTE INDICATING SYSTEM

Charles Oliver Cressy, East Providence, R. I.

Application January 22, 1938, Serial No. 186,323

5 Claims. (Cl. 177—351)

The object of this invention is to provide simple, inexpensive and reliable means for determining or indicating at a selected point what movement has taken place at a distant point. A special object is to provide an electrical indicating system which is not affected by fluctuations in line voltage. It is especially desired to check or measure the level of liquid at a distant point.

I employ what may be termed a modified form of alternating current Wheatstone bridge with an electromagnetically vibrated tuned reed connected across the center. Each branch has a reactance, one of which is varied automatically according to movement of a part. The reactance in the other branch is then adjusted until the reed ceases to vibrate which occurs when the bridge circuit is balanced. By properly calibrating the adjusting means it is possible to indicate what movements have taken place at a distance.

Fig. 1 is a diagrammatic view of a system involving one arrangement of my invention as applied to the problem of measuring and indicating the changes in level of a liquid.

Fig. 2 shows a different form of electromagnet.

Fig. 3 is a diagrammatic section of parts of indicating apparatus of somewhat different form for my system.

Fig. 4 is a perspective view of a unit of indicating apparatus.

Current is supplied from a transformer 5 which may be of the bell ringing type. The two halves 6 and 7 of the secondary are connected in the opposing branches of the circuit with the coils 8 and 9 respectively.

In the bridging circuit connected across between the two branches is the magnet coil 10. The coils 8 and 9 have suitable cores 11 and 12 and the coils and cores are so constructed as to permit relative movement. The tank 13 contains the liquid whose level is to be determined from a remote point. A float 14 is suitably connected to move the core 11 so that the reactance of the left hand branch of the circuit varies with the rise and fall of the liquid. The core 12 is arranged to be adjusted at will with respect to the coil 9 by a suitable hand operated device such as a knob 15 geared to the shaft 16 which is connected to the core 12. Unless the reactance in the indicating branch is equal to that in the other branch, current will flow through the bridge circuit coil 10 and the spring reed 17 which constitutes the armature of the electromagnet will vibrate (for instance at 60 cycles if that is the frequency of the current supplied). This vibration is so rapid that the reed is scarcely visible. When the core 12 is adjusted so as to balance the reactances of the two coils, the reed will stop vibrating and can be readily seen. I therefore provide a scale 18 which is connected or geared in suitable manner to move with the core 12. This scale is calibrated to read in suitable units of depth or volume of liquid in the tank.

The reed 17 and its actuating coil 10 may be protected against disturbing fields by a shield 19.

The electromagnet 10' for causing the vibration of the wire or reed 17 may be of the form shown in Fig. 2.

It has been found desirable to provide a small enlargement 17' on or adjacent the tip of the reed. This greatly facilitates the operation of adjustment of the reactance of coil 9 since it provides an expanse of observable surface much greater than the fine wire which is frequently used.

In the form shown in Fig. 3 the reed 17 is vibrated by a magnet coil 10 behind a translucent dial 18' upon which the shadow of the reed is cast by a lamp 20. This lamp may be in the transformer circuit or otherwise energized.

The knob 15' may be connected or geared to the dial 18' by cone or other gear 16' and serves to adjust the coil 9' with respect to the core 12'.

A switch 21 may be provided in the power circuit which may remain open except when a reading is to be taken.

It is understood of course that the reed is tuned to the frequency of the power circuit and that each leg or arm of the secondary has the same ohmic resistance and delivers the same voltage.

The transformer and the indicating means may be enclosed in a cabinet 22 or the power source may be located at some other convenient point.

I have illustrated the tip of the reed as the index pointer of the indicator and this is the simplest arrangement as it make it possible to focus attention upon the vibrating reed and the scale at the same time but the index may be stationary.

It will be understood that the scales or dials may be calibrated in any desired units of measurement. The same instrument may be used for different measurements by simply providing a suitable scale or dial graduated in the units desired. It should also be understood that the optical system illustrated may be varied within the scope of my invention.

This system is very simple and reliable and is quite insensitive to temperature changes. It will be understood that its use is not limited to the indication or measurement of liquid levels although that is an important and valuable one but the invention is only limited by the scope of the appended claims.

While it is possible to obtain some of the advantages of my invention by the substitution of variable resistances for the coils 8 and 9, I prefer the form shown partly because of its simplicity, sensitivity and reliability. In both cases, however, the impedance of the two branches should be designed and adjusted proportionally in order to indicate the movement which has taken place.

In view of the fact that the reading is taken only when the two branches of the bridge circuit are balanced it will be seen that fluctuations in the alternating current line voltage applied to the transformer will have no disturbing effect. In this respect the system is greatly superior to those employing ordinary rheostats and meters since any fluctuations in voltage in such systems render the meter readings inaccurate.

In case reactors are used for the variable elements, the reactive component of the impedance of each branch predominates. But if resistors are used for the variable elements of each branch, the reactive and resistive components may be comparable in magnitude. In either case, i. e. whether solenoids or rheostats are used for the variable arms, the resistance of the connecting wires may be of importance in some installations and should be provided for in calculations of such systems.

Likewise it will be understood that equalization of corresponding parts in each branch of the bridge circuit while desirable is not always necessary as long as the ratios of the bridge elements are so chosen that a balance may be obtained. Thus, if the tapped transformer is not tapped exactly in the center, the remaining elements must be so proportioned that a balance may be obtained.

In case the reactance at one element is greater than that at the other, the remaining elements must be proportioned accordingly. For instance, if the reactance of the tank coil is twice that of the indicating coil, the secondary tap in Fig. 1 should be placed so that the two sections have a reactance ratio of two to one.

I claim:

1. A remote indicating system comprising a transformer having a primary coil fed by alternating current an equally divided secondary and two connected branch circuits each including a variable reactance and one half of the secondary, an electromagnetic device having a coil connected in both branch circuits and a tuned reed vibrated thereby when the circuits are out of balance, means for adjusting one reactance so as to stop the vibration of the reed, and a scale movably connected to said adjusting means, said reed being visible adjacent said scale when said bridge circuit is balanced.

2. In a remote indicating system an alternating current bridge circuit containing in one branch an impedance variable automatically with changes in some conditions which it is desired to indicate at a remote point, and a manually adjustable impedance in the other branch, means for manually adjusting said latter impedance, a scale moved by said adjusting means proportionally to the changes in said latter impedance, a coil connected in the bridging connection, a bridging connection of said bridge circuit and a tuned vibrating reed cooperating with the coil and serving as an index for the scale when the bridge is balanced.

3. A remote indicating system comprising a bridge circuit containing an impedance in each branch and a bridging connection, a coil connected in the bridging connection and having a tuned reed serving as an armature, means for varying the impedance in one branch, means for adjusting the impedance in the other branch, and a scale movable with said adjusting means and calibrated to indicate the extent of variation of the varied reactance, said reed being located so as to be visible adjacent the scale when the bridge is balanced.

4. A remote indicator comprising an alternating current bridge circuit including an impedance in each branch and a bridging connection, a coil connected in the bridging connection and having a tuned vibrator reed serving as an armature, the impedance in one branch being variable, and means for adjusting the impedance in the other branch and indicating the amount of said adjustment when the vibrator reed is at rest, said means including a translucent scale, the reed being mounted behind the scale and vibrating in a plane substantially parallel with the plane of the scale, and a source of light behind said reed so as to cast the shadow of the reed upon the scale when the reed ceases to vibrate.

5. A remote indicating system comprising a manually adjustable impedance located at a point where it is desired to indicate variations, a variable impedance located at a remote point where variation occurs which it is desired to measure, a transformer having a primary and a secondary, the latter having two parts, a source of alternating current in the primary of the transformer, an electrical circuit including said impedances and said secondary, a bridging connection including a coil connected to said circuit between said impedances and between the parts of the divided secondary, and a tuned vibrating reed serving as the armature of said coil, means for adjusting said adjustable impedance so as to cause the reed to stop vibrating and remain stationary when the bridge is balanced, a scale calibrated to indicate the variations which it is desired to measure, and means of connection between said adjusting means and said scale whereby the scale moves with the adjusting means to indicate in cooperation with said reed the remote variation when the reed ceases to vibrate.

CHARLES OLIVER CRESSY.